（12） United States Patent
Li et al.

(10) Patent No.: US 10,637,307 B2
(45) Date of Patent: Apr. 28, 2020

(54) ELECTRIC MOTOR AND MAGNETIC CORE THEREOF (71) Applicant: Johnson Electric S.A., Murten (CH)

(72) Inventors: Yue Li, Hong Kong (CN); Maoxiong Jiang, Shenzhen (CN); Chuiyou Zhou, Shenzhen (CN); Yong Wang, Shenzhen (CN); Xiaoning Zhu, Shenzhen (CN); Guihua Li, Shenzhen (CN); Yonggang Zhang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 225 days.

(21) Appl. No.: 15/858,873

(22) Filed: Dec. 29, 2017

(65) Prior Publication Data

US 2018/0191209 A1 Jul. 5, 2018

(30) Foreign Application Priority Data

Dec. 29, 2016 (CN) .......................... 2016 1 1248842

(51) Int. Cl.
*H02K 1/24* (2006.01)
*H02K 1/17* (2006.01)
(Continued)

(52) U.S. Cl.
CPC ................ *H02K 1/17* (2013.01); *H02K 1/24* (2013.01); *H02K 1/2726* (2013.01); *H02K 5/161* (2013.01);
(Continued)

(58) Field of Classification Search
CPC .. H02K 1/00; H02K 1/06; H02K 1/08; H02K 1/12; H02K 1/14; H02K 1/146; H02K 1/17; H02K 1/22; H02K 1/24; H02K 21/10; H02K 21/28; H02K 21/30; H02K 29/00; H02K 37/03; H02K 37/10; H02K 2201/00; H02K 2213/03
(Continued)

(56) References Cited

U.S. PATENT DOCUMENTS 4,280,072 A * 7/1981 Gotou ...................... H02K 1/08
310/156.26
4,900,963 A * 2/1990 Amano .................... H02K 1/26
310/154.22
(Continued)

FOREIGN PATENT DOCUMENTS

DE 102010038764 A1 2/2012

*Primary Examiner* — Burton S Mullins
(74) *Attorney, Agent, or Firm* — Muncy, Geissler, Olds & Lowe, P.C.

(57) ABSTRACT

A magnetic core of an electric motor includes a central portion and a plurality of teeth extending outwardly from the central portion, the teeth disposed along a circumferential direction of the central portion. Each tooth includes a tooth body, two neck portions and two crown portions, the neck portions respectively connecting the crown portions to the tooth body, the two crown portions respectively extending beyond opposite sides of the tooth body. Each of the two neck portions of each tooth has a minimum width which is 0.1~0.3 times of the width of the tooth body. The present invention further provides an electric motor that employs the magnetic core which can increase the peak value of the cogging torque of the motor.

11 Claims, 7 Drawing Sheets (51) Int. Cl.
*H02K 5/16* (2006.01)
*H02K 1/27* (2006.01)
*H02K 23/40* (2006.01)

(52) U.S. Cl.
CPC ......... *H02K 23/40* (2013.01); *H02K 2201/03* (2013.01); *H02K 2213/03* (2013.01)

(58) Field of Classification Search
USPC ......... 310/111, 127–128, 177, 187, 216.074, 310/49.37
See application file for complete search history.

(56) References Cited

U.S. PATENT DOCUMENTS

| | | | | |
|---|---|---|---|---|
| 4,994,702 A * | 2/1991 | Arita | ................... | H02K 1/2786 310/154.28 |
| 5,250,867 A * | 10/1993 | Gizaw | ................... | H02K 21/16 310/156.12 |
| 5,912,515 A * | 6/1999 | Ackermann | ........... | H02K 29/03 310/67 R |
| 6,917,132 B2 * | 7/2005 | Honkura | ................. | H01F 7/021 310/154.22 |
| 7,221,071 B2 * | 5/2007 | Fratta | ..................... | H02K 1/246 310/156.53 |
| 7,268,457 B2 * | 9/2007 | Noda | ....................... | H02K 1/24 310/215 |
| 8,350,437 B2 * | 1/2013 | Doushita | ................ | H02K 1/146 310/198 |
| 8,492,953 B2 * | 7/2013 | Lau | ........................ | H02K 3/325 310/269 |
| 8,519,593 B2 * | 8/2013 | Suzuki | ................... | H02K 1/146 310/216.092 |
| 8,783,723 B2 * | 7/2014 | Chang | .................... | H02K 23/30 280/806 |
| 2008/0024028 A1 * | 1/2008 | Islam | ...................... | H02K 5/22 310/187 |
| 2016/0218586 A1 | 7/2016 | Li et al. | | |

* cited by examiner

ELECTRIC MOTOR AND MAGNETIC CORE THEREOF

CROSS REFERENCE TO RELATED APPLICATIONS

This non-provisional patent application claims priority under 35 U.S.C. § 119(a) from Patent Application No. 201611248842.4 filed in The People's Republic of China on Dec. 29, 2016.

FIELD OF THE INVENTION

The present invention relates to the field of electric motors, and in particular to a permanent magnet motor and a magnetic core of the motor.

BACKGROUND OF THE INVENTION

A permanent magnet brush motor usually comprises a stator and a rotor. The stator comprises a housing and permanent magnets mounted to the inner surface of the housing. The rotor comprises a rotating shaft, a magnetic core and a commutator fixed to the rotating shaft, and a rotor winding wound around the magnetic core. There exists the tooth-slot effect between the stator and the rotor. In some applications, it is expected that the motor has a larger cogging torque. For example, for roller shutter motors, it is desirable to increase the cogging torque of motor so that the motor can stop the shutter at any designated positions without additional brake devices to thereby simplify the structure and reduce the cost of the roller shutter.

SUMMARY OF THE INVENTION

Thus, there is a desire for a motor which has an increased cogging torque.

In one aspect, the present invention provides a magnetic core of an electric motor which comprises a central portion, and a plurality of teeth extending outwardly from the central portion in respective longitudinal directions, the teeth disposed along a circumferential direction of the central portion. Each tooth comprises a tooth body, two neck portions and two crown portions, the tooth body having a transverse width in a direction perpendicular to the longitudinal direction of the tooth body, the neck portions extending from an outer end of the tooth body in their respective longitudinal directions and bifurcated from each other, each neck portion having a transverse width in a direction perpendicular to the longitudinal direction of said each neck portion, the two crown portions being respectively connected to ends of the neck portions far away from the tooth body, and extending towards opposite sides of the tooth body in circumferential directions; A minimum of the transverse width of each neck portions is 0.1~0.3 times of the transverse width of one of the tooth body, on which said each neck depends.

Preferably, a recess is formed between the two crown portions of each tooth, the recess having an opening with a width which is 0.6~0.8 times of the width of the tooth body.

Preferably, a recess is formed between the two crown portions of each tooth, the recess having a radial depth which is 0.7~1.8 times of the width of the opening of the recess.

Preferably, a recess is formed between the two crown portions of each tooth, the recess being U-shaped, V-shaped or square-shaped.

Preferably, the two crown portions of each tooth are connected together to form an integral crown, a through hole being formed between the integral crown, the tooth body and the two neck portions.

Preferably, the through hole is round.

Preferably, the central portion defines a mounting hole for allowing a rotating shaft to be mounted therein.

Preferably, the magnetic core further includes a plurality of separation members extending outwardly from the central portion, each separation member being disposed between adjacent two tooth bodies and having a radial length which is less than a radial length of the tooth body.

In another aspect, the present invention provides an electric motor which comprises a stator and a rotor. The stator comprises a housing and a plurality of permanent magnets mounted to an inner surface of the housing. The rotor comprises a rotating shaft and a magnetic core formed by the magnetic core described above. The magnetic core is fixedly mounted on the rotating shaft. The rotating shaft is rotatably mounted to the stator so that the rotor is capable of rotating relative to the stator and the magnetic core is received in the housing, Preferably, a ratio of an inner diameter of the housing to an outer diameter of the housing is less than 0.93.

Preferably, an outer diameter of the magnetic core is 0.6~0.8 times of an inner diameter of the housing.

Preferably, the at least one permanent magnet has a magnetic energy product greater than 4 MGOe.

Preferably, the electric motor is a 2-pole 3-slot motor.

Preferably, wherein a peak value of cogging torque of the electric motor is in the range of 8~14 mNm.

The magnetic core of the present embodiments can increase the peak value of the cogging torque of the motor.

BRIEF DESCRIPTION OF THE DRAWINGS

Below, embodiments of the present invention will be described in greater detail with reference to the drawings. It should be noted that the figures are illustrative rather than limiting, wherein.

DETAILED DESCRIPTION OF THE PREFERRED EMBODIMENTS

Elements of similar structures or functions are generally represented by like reference numerals for illustrative purposes throughout the figures. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

Figure 1:
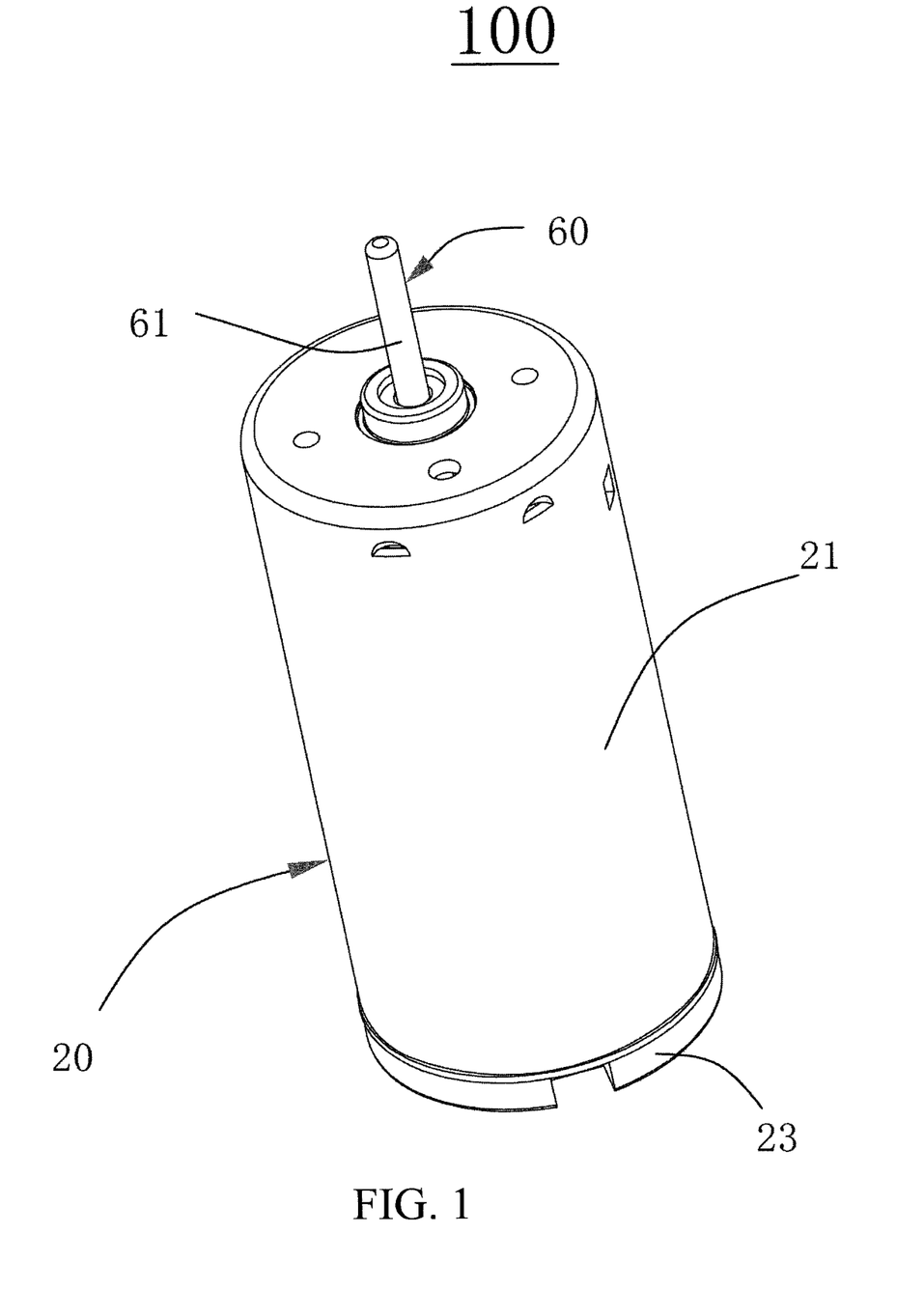
FIG. 1 is a perspective view of an electric motor according to one embodiment of the present invention.

Referring to FIG. 1, an electric motor 100 in accordance with an embodiment of the present invention is a permanent magnet electric motor. The motor 100 includes a stator 20 and a rotor 60. The stator 20 includes a cylindrical housing 21 with an opening at one end, and an end cap 23 mounted to the open end of the housing 21. The rotor 60 is rotatably mounted to the stator 20.

Figure 2:
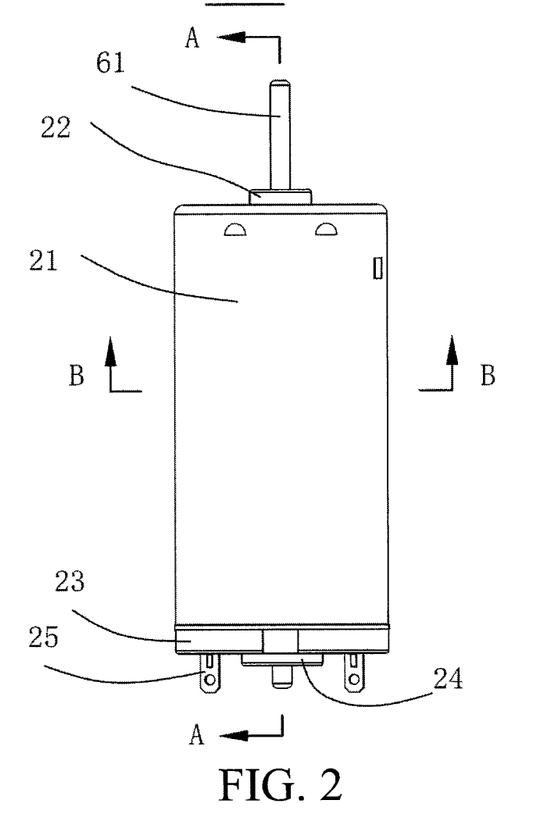
FIG. 2 is a side view of the motor of FIG. 1.
Figure 3:
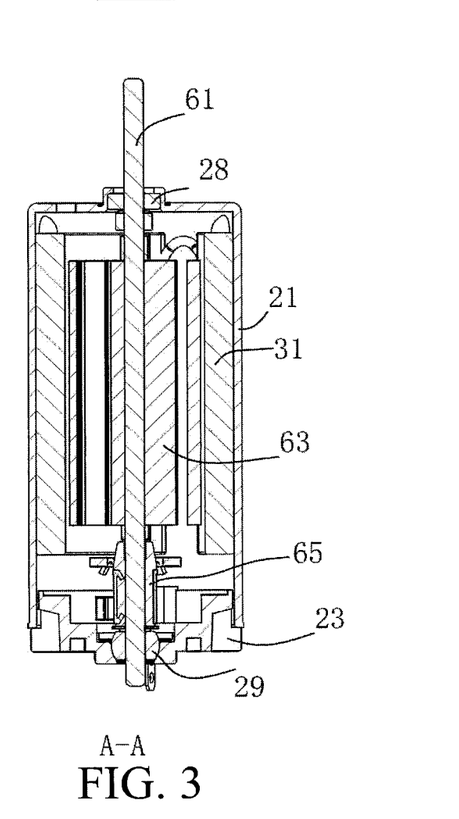
FIG. 3 is a cross section view of the motor of FIG. 2, taken along line A-A.
Figure 4:
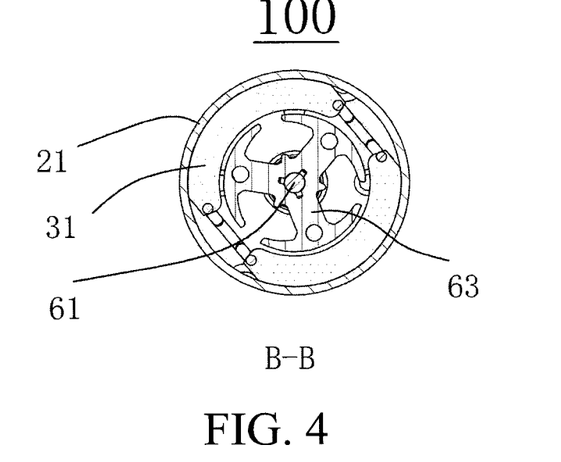
FIG. 4 is a cross section view of the motor of FIG. 2, taken along line B-B.

Referring to FIG. 2 to FIG. 4, the end wall of the cylindrical housing 21 is provided with a bearing seat 22. A bearing 28 is mounted in the bearing seat 22. Preferably, the bearing 28 is a straight bearing with straight axial contour lines. Another bearing seat 24 is arranged in the middle of the end cap 23 and a bearing 29 is arranged in the bearing seat 24. Preferably, the bearing 29 has curved axial contour lines. A rotating shaft 61 is supported by bearings 28 and 29 so as to rotate relative to the stator 20.

The rotor 60 comprises the rotating shaft 61, a magnetic core 63 and a commutator 65 fixedly sleeved on the rotating shaft 61, and a rotor winding (not shown) wound on the magnetic core 63 and electrically connected with the commutator 65.

The stator 20 further includes one or more permanent magnets 31 mounted to the inner surface of the housing 21, and an electrical brush assembly mounted to the end cap 23, terminals 25 mounted to the end cap 23, and so on. The one or more permanent magnets 31 form a plurality of permanent magnet poles. The terminals 25 are configured to connect with an external power supply and supply power to the brush assembly. The brush assembly electrically contacts with commutator segments of the commutator 65 to thereby supply power to the rotor winding. Because the power supply circuit is not the important parts of the present invention, the detailed description thereof is omitted.

Figure 5:
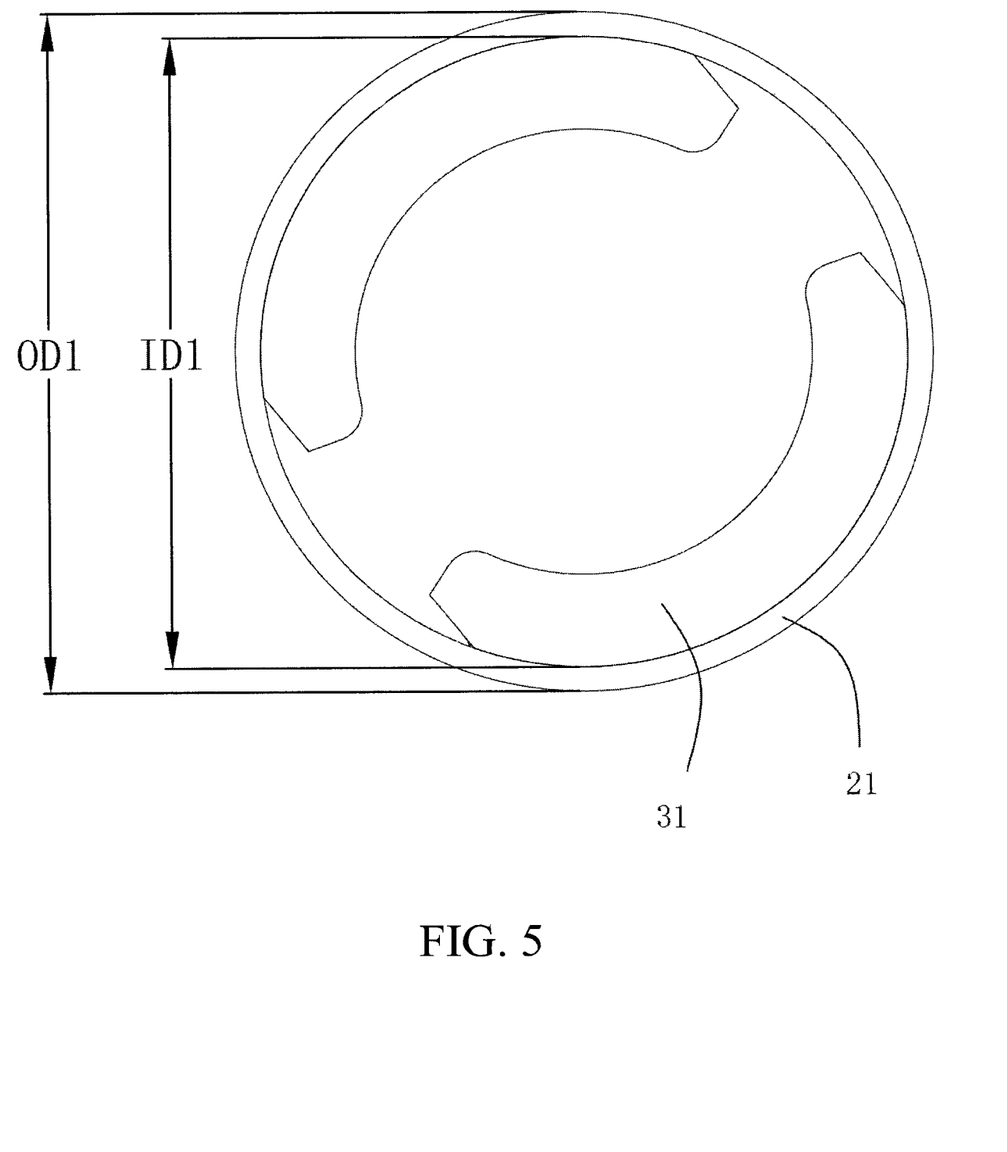
FIG. 5 illustrates a housing and magnets of the motor of FIG. 1.

Referring to FIG. 5, the ratio of the inner diameter ID1 of the housing 21 to the outer diameter OD1 of the housing 21 is less than 0.93. That is to say, the radial thickness of the housing 21 is above the preset percentage of the outer diameter OD1 of the housing 21, so that different permanent magnet poles mounted to the inner surface of the housing 21 can form closed magnetic flux circuits through the housing 21. Preferably, the magnetic energy product of the permanent magnet 31 is greater than 4 MGOe in order to increase the peak value of the cogging torque of the motor.

Figure 6:
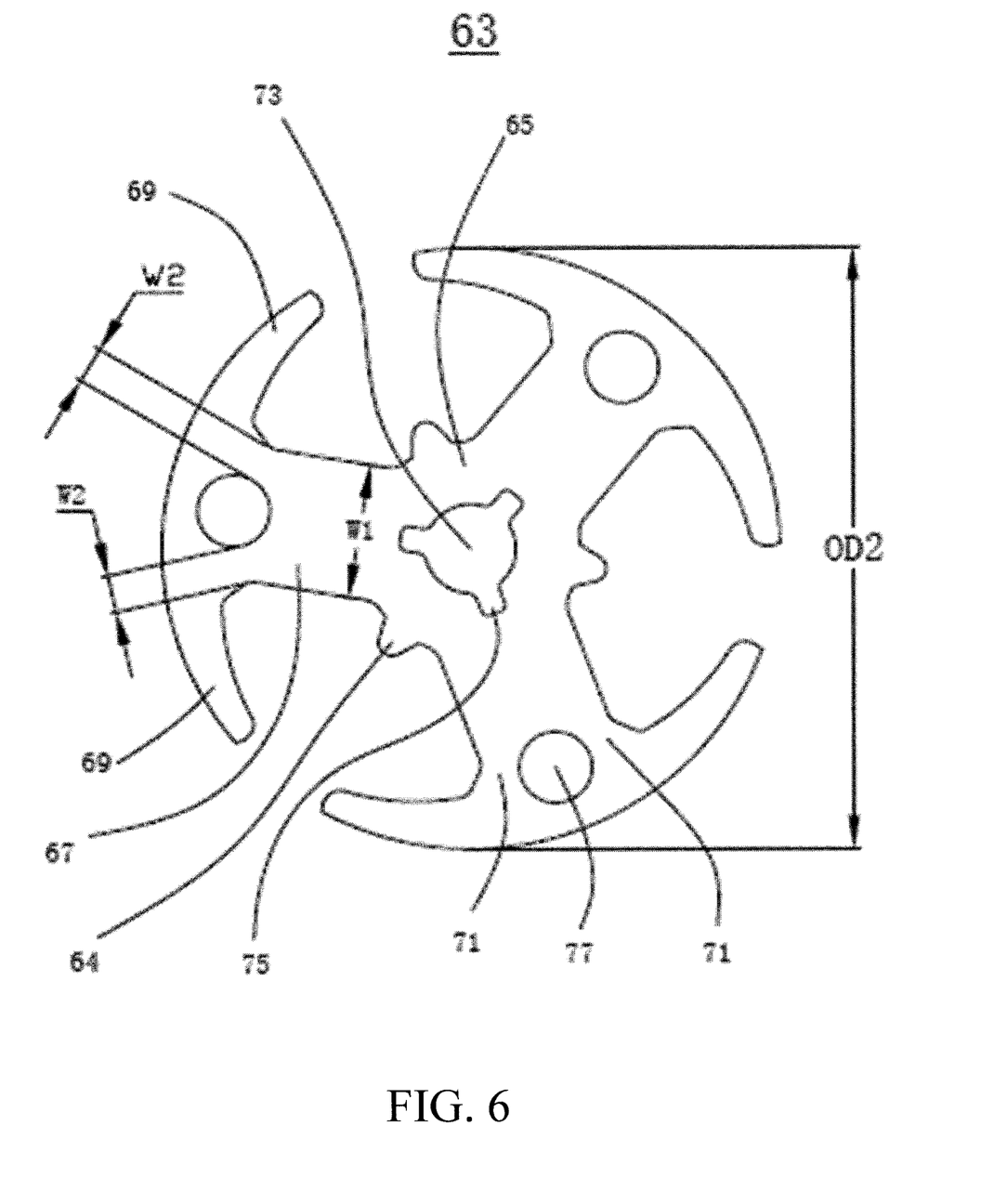
FIG. 6 illustrates a magnetic core of the motor of FIG. 1.

Referring to FIG. 5 and FIG. 6, preferably, the outer diameter OD2 of the magnetic core 63 is 0.6~0.8 times of the inner diameter ID1 of the housing 21 in order to further increase the peak value of the cogging torque of the motor.

In this embodiment, the stator 20 comprises two permanent magnets 31 (FIG. 4) respectively forming two stator magnetic poles. The rotor 60 comprises three teeth with three slots respectively formed between adjacent teeth. Thus, the motor 100 may be called a 2-pole 3-slot permanent magnet direct current brush motor. Preferably, the peak value of the cogging torque of the motor is in the range of 8~14 mNm.

Refer to FIG. 6, the magnetic core 63 includes a central portion 65 and three teeth extending outwardly from the central portion 65 in respective longitudinal directions. The three teeth are disposed along the circumferential direction of the central portion 65. Each tooth comprises a tooth body 67, two neck portions 71 and two crown portions 69. The tooth body 67 has a transverse width W1 in a direction perpendicular to the longitudinal direction thereof. The two neck portions 71 extend from an outer end of the tooth body 67 in respective longitudinal directions and bifurcated from each other. Each neck portion 71 has a transverse width W2 in a direction perpendicular to the longitudinal direction thereof. The two crown portions 69 are respectively connected to ends of the neck portions 71 far away from the tooth body 67, and extending in opposite circumferential directions away from the tooth body 67.

A minimum of transverse width W2 of each neck portion 71 is 0.1~0.3 times of the width W1 of the correspond one the tooth body 67. Preferably, A minimum of W2 is 0.15 to 0.25 times of W1.

In this embodiment, the two crown portions 69 of each tooth are connected together to form a whole crown which forms a continuous pole face toward the housing 21 or permanent magnets 31. A through-hole 77 is formed between the whole crown and the tooth body 67, and the two neck portions 71 are respectively positioned at opposite sides of the through hole 77, i.e., the two neck portions 71 respectively connecting the whole crown to the two side portions of the tooth body 67 and the round through hole 77 is thus formed between the whole crown, two neck portions 71 and the tooth body 67.

The central portion 65 of the magnetic core 63 has a mounting hole 73 that is fixed to the rotating shaft 61 (FIG. 4). A plurality of anti-slipping grooves 75 is formed in the inner wall of the central portion 65 surrounding the mounting hole 73, for preventing the magnetic core 63 from rotating relative to the rotating shaft 61.

The central portion 65 further includes a plurality of separation members 65 extending outward from the outer surface of the central portion 65. Each separation member 65 is located between adjacent two tooth bodies 67 and has a radial length smaller than the radial length of the tooth body 67.

The invention is illustrated by an example of a 2-pole 3-slot motor. Understandably, the present invention is not limited to the 2-pole 3-slot motor.

Figure 7:
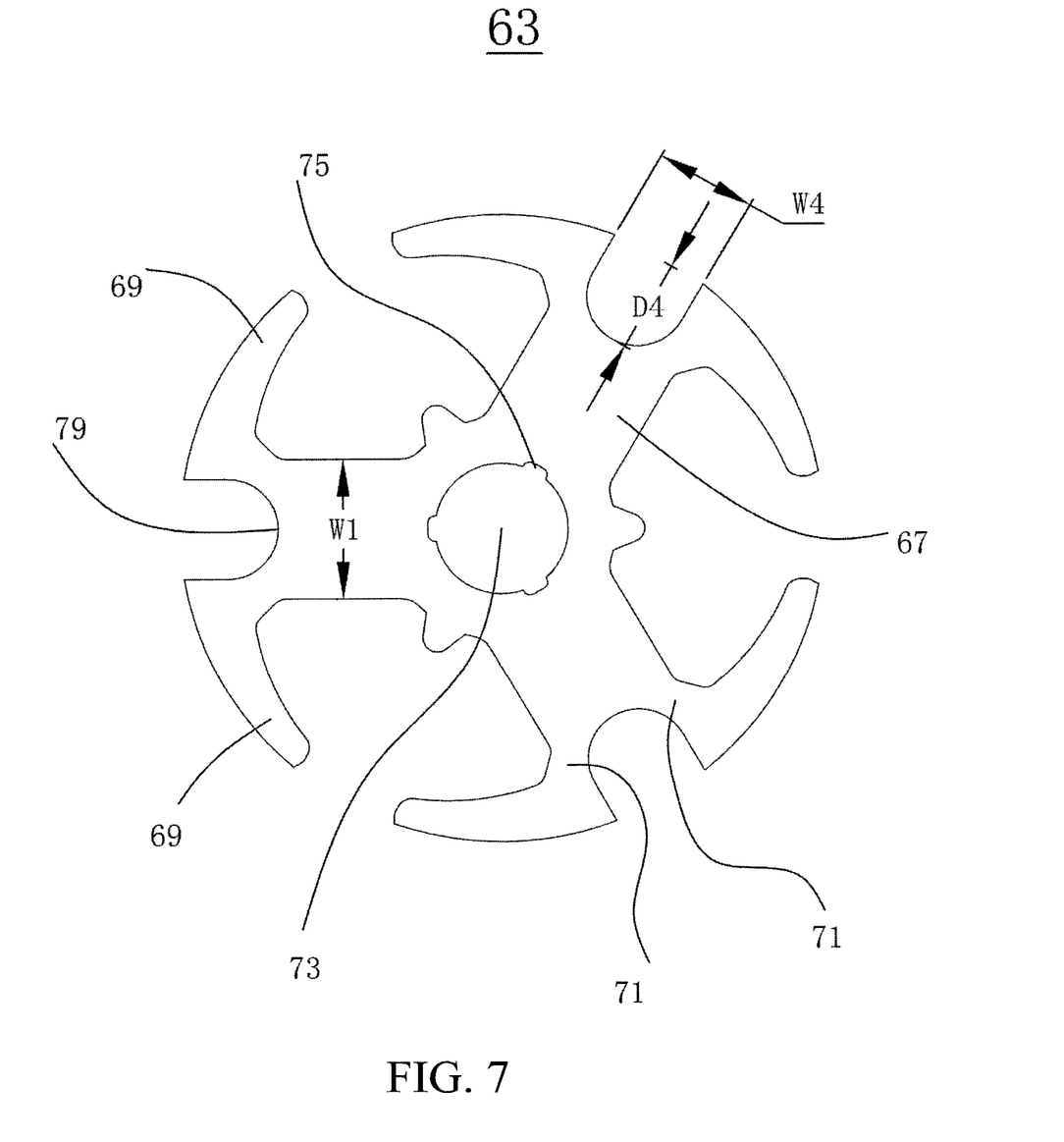
FIG. 7 illustrates a magnetic core of a motor according to a second embodiment of the present invention.

FIG. 7 illustrates a magnetic core 63 used by a motor in accordance with a second embodiment of the present invention. Compared with the before embodiment, the main changes in the magnetic core of this embodiment is that the two crown portions 63 of each tooth 69 are not connected together but separated from each other. The two crown portions 69 are respectively connected to the tooth body 67 by two neck portions 71. A recess 79 is formed between the two crown portions 69 of each tooth. The recess 79 has an opening which communicates the recess 79 with the radial periphey of the crown portions 63. The opening of the recess 79 has a width W4 which is 0.6~0.8 times of the width W1 of the tooth body 67. The recess 79 has a radial depth D4 which is 0.7~1.8 times of the width W4 of the opening of the recess 79.

In the present embodiment, the recess 79 is a U-shaped recess, i.e., the axial cross section of the recess 79 is U-shaped.

Figure 8:
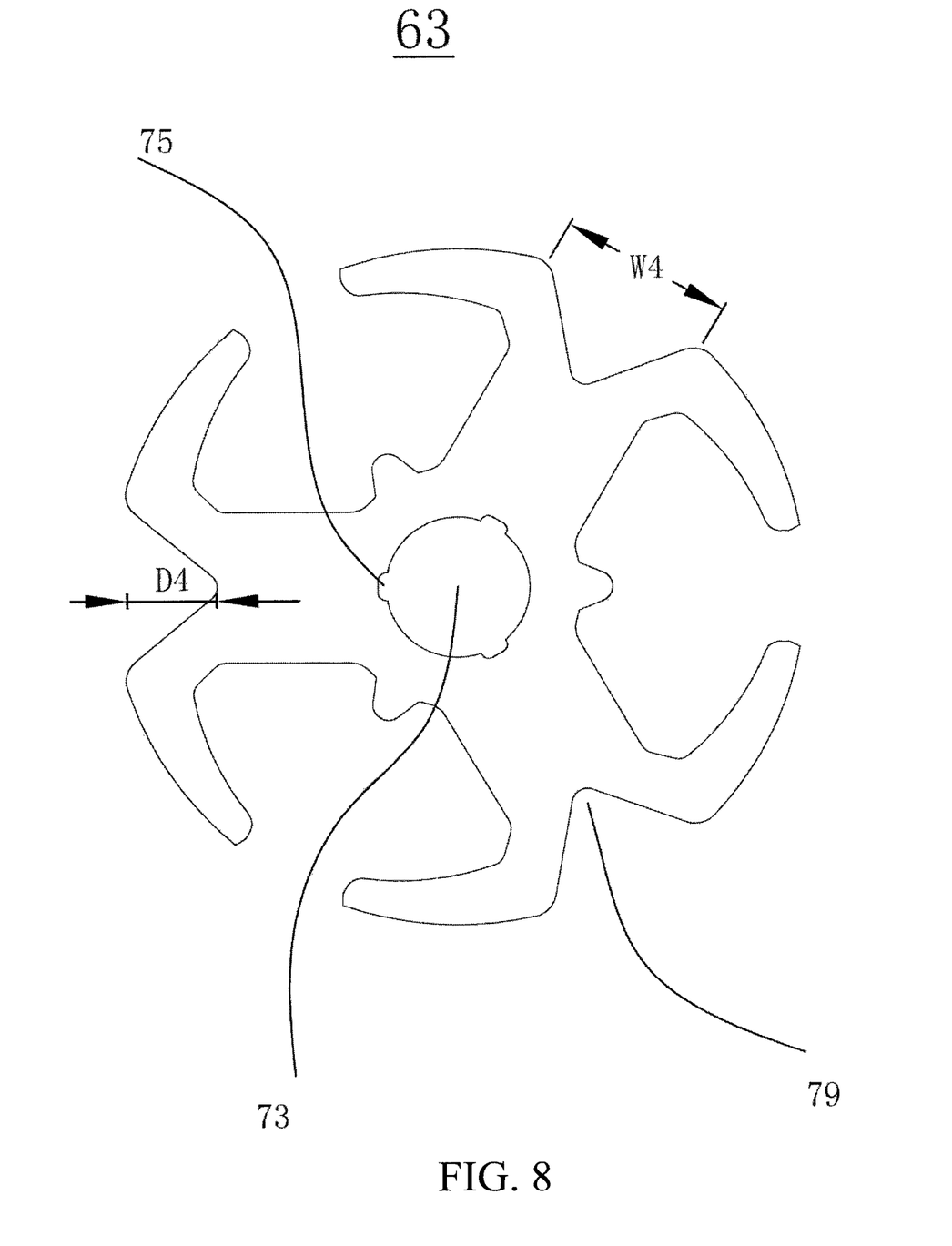
FIG. 8 illustrates a magnetic core of a motor according to a third embodiment of the present invention.
Figure 9:
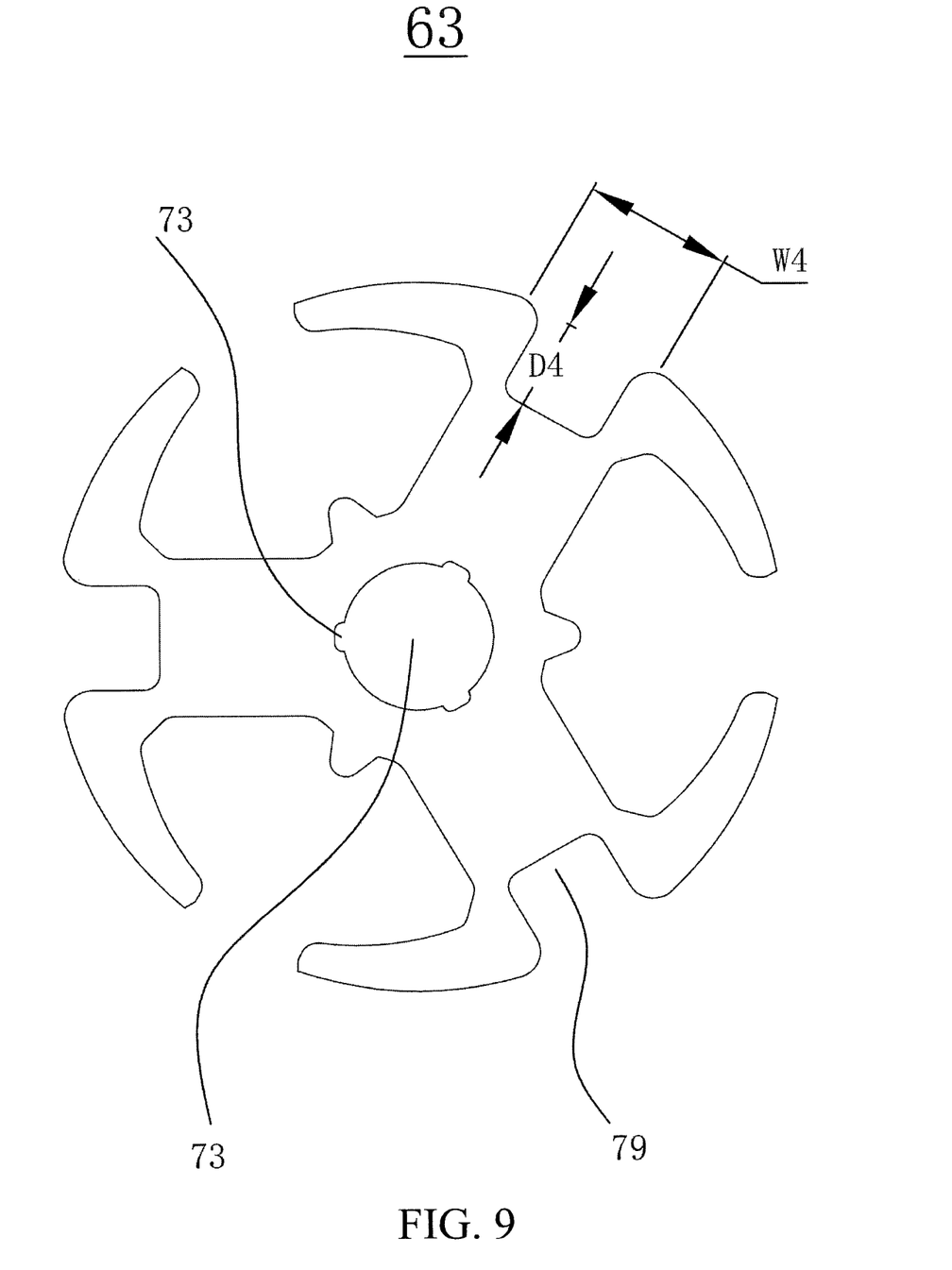
FIG. 9 illustrates a magnetic core of a motor according to a fourth embodiment of the present invention.

Understandably, the shape of the recess 79 is not limited to the U shape. For example, in other alternative embodiments, the recess 79 is V-shaped (as shown in FIG. 8) or square-shaped (as shown in FIG. 9).

Understandably, in other alternative embodiments, the aforementioned magnetic core 63 may be used as the stator magnetic core of a motor.

Therefore, the technical solutions of embodiments of the present invention have been clearly and completely described above. Apparently, the described embodiments are merely part of, rather than all of, the embodiments of the present invention. A person skilled in the art may make various combinations of technical features in the various embodiments to meet practical needs. Based on the described embodiments of the present invention, any other embodiment obtained by a person skilled in the art without paying creative efforts shall also fall within the scope of the present invention.

The invention claimed is:

1. A rotor magnetic core of an electric motor, comprising:
a central portion, and
a plurality of teeth extending outwardly from the central portion in respective longitudinal directions, the teeth disposed along a circumferential direction of the central portion;
wherein each tooth comprises a tooth body, two neck portions and two crown portions, the tooth body having a transverse width in a direction perpendicular to the longitudinal direction of the tooth body, the neck portions extending from an outer end of the tooth body in their respective longitudinal directions and bifurcated from each other, each neck portion having a transverse width in a direction perpendicular to the longitudinal direction of said each neck portion, the two crown portions being respectively connected to ends of the neck portions far away from the tooth body, and extending towards opposite sides of the tooth body in circumferential directions; and
wherein a minimum of the transverse width of each neck portions is 0.1~0.3 times of the transverse width of one of the tooth body, on which said each neck portion depends, and a recess is formed between the two crown portions of each tooth of the rotor magnetic core, the recess having an opening with a width which is 0.6~0.8 times of the width of the tooth body of the tooth of the rotor magnetic core; and
wherein the rotor magnetic core further comprises a plurality of separation members extending outwardly from the central portion, each separation member being disposed between adjacent two tooth bodies and having a radial length which is less than a radial length of the tooth body.

2. The rotor magnetic core of claim 1, wherein a recess is formed between the two crown portions of each tooth, the recess having a radial depth which is 0.7~1.8 times of the width of the opening of the recess.

3. The rotor magnetic core of claim 1, wherein a recess is formed between the two crown portions of each tooth, the recess being U-shaped, V-shaped or square-shaped.

4. The rotor magnetic core of claim 1, wherein the two crown portions of each tooth are connected together to form an integral crown.

5. The rotor magnetic core of claim 1, wherein the central portion defines a mounting hole for allowing a rotating shaft to be mounted therein, and a plurality of anti-slipping grooves is formed in an inner wall of the central portion surrounding the mounting hole.

6. An electric motor, comprising:
a stator, the stator comprising a housing and at least one permanent magnet mounted to an inner surface of the housing;
a rotor comprising a rotating shaft and a rotor magnetic core fixedly mounted on the rotating shaft, the rotating shaft being rotatably mounted to the stator so that the rotor is capable of rotating relative to the stator and the rotor magnetic core being received in the housing and comprising:
a central portion, and
a plurality of teeth extending outwardly from the central portion, the teeth disposed along a circumferential direction of the central portion;
wherein each tooth comprises a tooth body, two neck portions and two crown portions, the tooth body having a transverse width in a direction perpendicular to the longitudinal direction of the tooth body, the neck portions extending from an outer end of the tooth body in their respective longitudinal directions and bifurcated with each other, each neck portion having a transverse width in a direction perpendicular to the longitudinal direction of said each neck portion, the two crown portions respectively connected to ends of the neck portions far away from the tooth body, and extending towards opposite sides of the tooth body in circumferential directions; and
wherein a minimum of the transverse width of each neck portions is 0.1~0.3 times of the transverse width of one of the tooth body, on which said each neck portion depends, and a recess is formed between the two crown portions of each tooth of the rotor magnetic core, the recess having an opening with a width which is 0.6~0.8 times of the width of the tooth body of the tooth of the rotor magnetic core;
wherein the rotor magnetic core further comprises a plurality of separation members extending outwardly from the central portion, each separation member being disposed between adjacent two tooth bodies and having a radial length which is less than a radial length of the tooth body.

7. The electric motor of claim 6, wherein a ratio of an inner diameter of the housing to an outer diameter of the housing is less than 0.93.

8. The electric motor of claim 6, wherein an outer diameter of the rotor magnetic core is 0.6~0.8 times of an inner diameter of the housing.

9. The electric motor of claim 6, wherein the at least one permanent magnet has a magnetic energy product greater than 4 MGOe.

10. The electric motor of claim 6, wherein the electric motor is a 2-pole 3-slot motor.

11. The electric motor of claim 6, wherein a peak value of cogging torque of the electric motor is in the range of 8~14 mNm.

* * * * *